United States Patent [19]
Hatcher et al.

[11] Patent Number: 5,657,353
[45] Date of Patent: Aug. 12, 1997

[54] PULSE SHAPING FILTER FOR RECEIVED DIGITAL TRANSMISSIONS USING PHASE LOCK LOOP FOR ADJUSTING SHIFT REGISTER

[75] Inventors: G. Stephen Hatcher; Mark G. Roberts, Jr., both of Renton, Wash.

[73] Assignee: Stellar One Corporation, Seattle, Wash.

[21] Appl. No.: 999,087

[22] Filed: Dec. 31, 1992

[51] Int. Cl.$^6$ .................................................. H04L 25/03
[52] U.S. Cl. ........................ 375/296; 375/371; 327/156; 327/284
[58] Field of Search ...................... 332/107, 123, 332/124, 159, 160, 103, 104; 375/296, 348, 350, 371, 278, 327; 327/231, 261, 156, 284

[56] References Cited

U.S. PATENT DOCUMENTS

| | | | |
|---|---|---|---|
| 4,646,327 | 2/1987 | Kojima et al. | 375/296 |
| 4,737,969 | 4/1988 | Steel et al. | 375/298 |
| 4,757,519 | 7/1988 | Collison et al. | 375/296 |
| 5,068,874 | 11/1991 | Leitch | 375/278 |
| 5,253,272 | 10/1993 | Jaeger et al. | 375/296 |
| 5,299,230 | 3/1994 | Jaeger et al. | 375/296 |

OTHER PUBLICATIONS

J. Cooper, "Sine Squared Shaping of Sync and Drive Pulses," IEEE Trans. on Broadcasting, vol. 36 No. 2, pp. 162–169, Jun. 1990.

*Primary Examiner*—Young T. Tse
*Assistant Examiner*—William Luther
*Attorney, Agent, or Firm*—Christensen, O'Connor, Johnson & Kindness

[57] ABSTRACT

A pulse shaping filter for shaping pulses received at a specified data rate is disclosed. The filter has a desired impulse response associated with a plurality of sampled values. The filter includes a sampling circuit responsive to the input pulses, such that each pulse is sampled at a desired sampling rate. A delay circuit provides a plurality of delayed versions of the sampled pulse, wherein said sampled pulse propogate through said delay circuit at a unit delay time substantially equal to the period of the desired sampling rate. A plurality of resistors are coupled to the delay circuit, each resistor providing a weighing coefficient by which the delayed versions of the sampled pulses are multiplied to provide a plurality of weighed delayed pulses. A summing circuit is adapted to add all said weighed delayed pulses to provide shaped pulses. The resistors are selected such that each sum of said weighed delayed pulses as the pulses are propogated through the delay circuit is substantially equal to a corresponding sampled value of said impulse response.

8 Claims, 4 Drawing Sheets

PULSE SHAPING FILTER FOR RECEIVED DIGITAL TRANSMISSIONS USING PHASE LOCK LOOP FOR ADJUSTING SHIFT REGISTER

1. FIELD OF THE INVENTION

This invention relates to a new pulse shaping filter, more specifically a pulse shaping filter for eliminating intersymbol interference during transmission of digital data.

2. BACKGROUND OF THE INVENTION

Currently, digital transmission technology has been moving to the transmission of higher and higher data rates over given channel bandwidths, using multilevel signaling and faster bit rates.

In digital transmission, a plurality of pulses are transmitted in specific time slots and thereafter are received at corresponding time slots by a receiver. As bit rates increase, there can be a considerable spillover of pulse energy into adjacent time slots, resulting in intersymbol interference.

For example, a transmitter may transmit a stream of pulses at T-second intervals. Inherent characteristics of the transmission system causes these pulses to spread out as they traverse the system. Therefore, the receiver might receive the pulses that have overlapped into adjacent time slots. At the receiver, the original pulse message may be derived by sampling at the center of each time slot. The receiver then bases a decision on the amplitude of the signal measured at that point and assigns a 1 or 0 based on the decision.

If, however, the pulses have overlapped sufficiently in adjacent time slots, the receiver may mistake an intended 0 as 1, due to intersymbol interface.

Intersymbol interference may be minimized by purposely widening the transmission bandwidth as much as desired. However, virtually all transmissions are bound by bandwidth efficiency. Furthermore, widening bandwidths may result in allowing too much noise to interfere in the system. Therefore, signal waveshapes and consequently filters are purposely designed to eliminate interference with as small a transmission bandwidth as possible.

One signal waveshape producing zero intersymbol interference is $$\frac{\operatorname{Sin} x}{x}.$$

pulse as shown in FIG. 1. The main lobe (center portion) of the spectrum is generally all that is needed to ensure accurate information transfer.

The waveform illustrated in FIG. 1 goes through zero at equally spaced intervals, multiples of T seconds away from the peak at the origin. The waveform of FIG. 1 is the impulse response of an ideal low-pass filter illustrated in FIG. 2. The frequency spectrum of an ideal filter is flat, over frequency to a cut-off frequency fc hertz and is zero elsewhere, 2fc pulses may thus be transmitted over a bandwidth of fc hertz if the waveshape of FIG. 1 is used.

Therefore, by shaping pulses into the waveform of FIG. 1, it is possible to eliminate intersymbol interference. A major difficulty with such a waveshaping is that ideal low-pass filters are presently unavailable.

Alternatively, it has been found by H. Nyquist that some other classes of waveshapes may also provide zero intersymbol interference. This particular class of waveshapes are designed such that their frequency characteristic has odd symmetry about the low-pass cut-off point. Filters with such odd symmetry characteristics are commonly known as Nyquist filters.

Currently, various filtering techniques have been implemented. One approach is a strictly digital filter using digital signal processing techniques. Another approach is using arbitrary waveform generators. Still another technique is designing analog filters.

Digital signal processing is now considered to be well established, and is suited to the general problem of digital data spectral filtering. A finite impulse response (FIR) filter would be a good implementation as it can possess linear phase response, adequate spectral roll-off and perfect repeatability. One difficulty with digital signal processing (DSP) technique is its limited application to high-bit transmission rates like those required by video data transmission. A typical compressed video transmission rate can be in the order of 3.MB/sec (million bits per second). This is an order of magnitude faster than what can be handled using available digital signal processing (DSP) hardware. To achieve high transmission rates there is need to resort to full custom GaAs IC development, which is not cost efficient.

An alternate digital approach is to develop a type of arbitrary waveform generator. This involves using a digital look-up table to program the output of a digital-to-analog converter (DAC) to a specific level depending on the past and current serial data values, simulating an ideally filtered signal. This technique, however, requires a very high clock rate. Implementing the filter would require some very high speed digital circuits, drawing and dissipating more power than desired.

Analog filters can be scaled for high frequency applications and are comparatively easy to implement. However, a problem with analog filters is that they generally do not exhibit linear phase response, which is a requirement for eliminating intersymbol interference. One approach to linearize phase responses is designing phase compensation networks. For video data transmission such analog filters with phase compensation networks become complicated. Additionally, their characteristics are not consistent without extremely low tolerance and high cost parts.

Another approach is known as programmable transversal filter (BTF). Typically, the digital data stream is shifted into a shift register. The parallel output taps of the shift register are then summed using stored coefficients or weights to result in an analog output. The output is then smoothed through anti-aliasing filter.

One difficulty with the filter is the delay associated with retrieving the stored coefficient from memory. Another difficulty with the filter is determining the tap weights in the system. The weights associated with the taps of the filter are derived from the impulse response to the desired filter. Given the desired frequency domain response of the filter, the impulse response can be calculated by an inverse Laplace transformation. For a Nyquist filter, the mathematics involved in the inverse transformation can be very complicated and intractable. Thus, there is a need for a simplified design of a Nyquist filter suitable for very high speed digital transmissions.

3. SUMMARY OF THE INVENTION

Accordingly, an object of the present invention is to provide a Nyquist filter to minimize intersymbol interference.

A further object of the present invention is to provide an apparatus and method for waveshaping digitally transmitted pulses such that each bit of information does not affect the ability of a receiver to discern the state of preceding or following bits of information.

Still, a further object of the present invention is to provide a Nyquist filter wherein the filter characteristics do not degrade with time or environmental variation such as temperature.

A further object of the invention is to provide a moderate cost, high performance, compact and reliable Nyquist filter for the digital transmission of video or audio information.

A still further object of the present invention is to provide a Nyquist filter, given the frequency domain response of the desired filter, without deriving the impulse response mathematically by an inverse Laplace transformation.

Accordingly, the filter may include a desired Nyquist waveshape generator which is sampled into a series of values at discrete time instants representing the desired impulse response of the filter. Digital pulses desired to be shaped enter a shift register in the filter. As each bit in the stream of digital pulses is shifted through the shift register it is multiplied by a desired filter tap weight. The tap weights are determined such that the sum of tap weight produced times shifted bit streams is equal to the corresponding discrete impulse response value. The impulse may be considered as a single binary one shifted through the shift register, resulting in a set of tap weights whose values are equal to the impulse response time series. At the end of the sequence, as the stretched impulse passes out of the shift register, a signal substantially equivalent to the desired impulse response is provided.

4. BRIEF DESCRIPTION OF THE DRAWINGS

5. DETAILED DESCRIPTION OF THE DRAWINGS

As described hereinabove, when the frequency characteristic of a filter is designed to have odd symmetry about the low-pass cut-off point, the resultant impulse response retains the desired property of having zeros at uniformly spaced time intervals.

Figure 1:
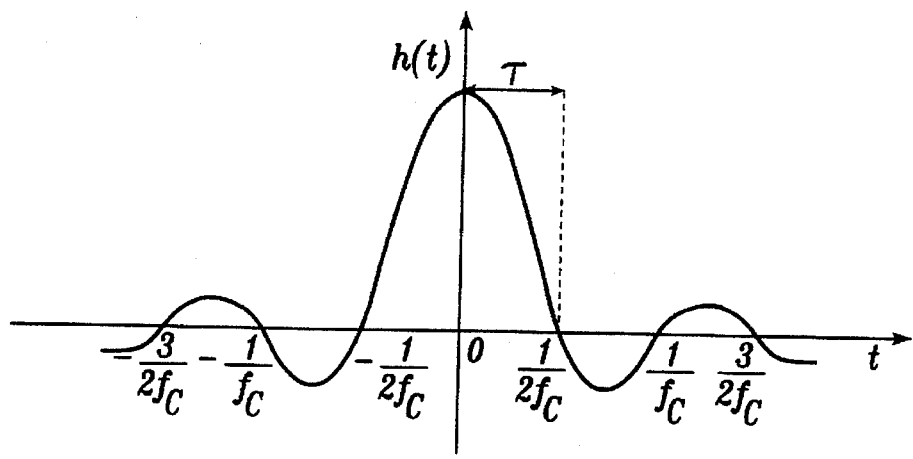
FIG. 1 illustrates a pulse providing zero intersymbol interference.
Figure 2:
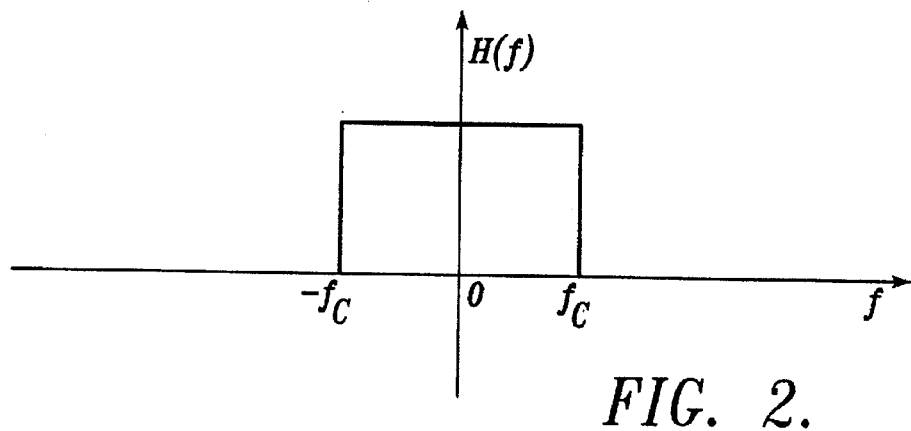
FIG. 2 illustrates the frequency spectrum of the pulse illustrated in FIG. 1.
Figure 3:
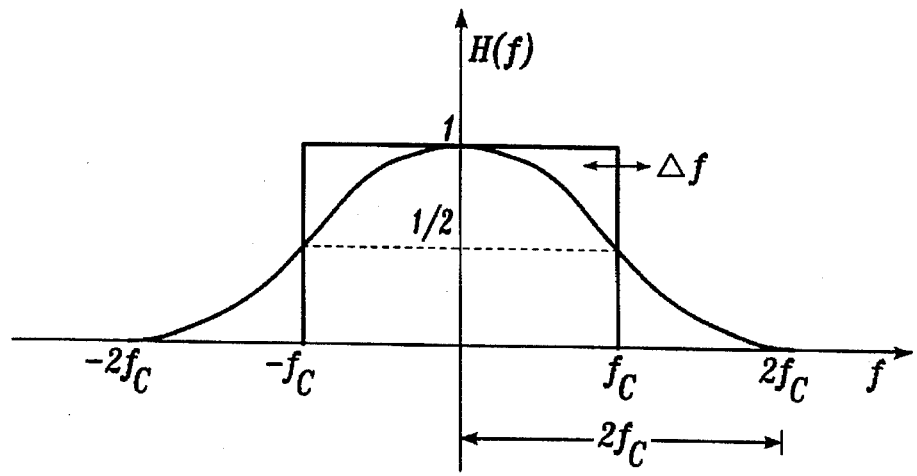
FIG. 3 illustrates a raised cosine spectrum.

FIG. 3 illustrates an example of such a spectrum known as raised cosine spectrum. The raised cosine pulse can be mathematically defined by the following formula:

$$\text{raised cosine of } (t): \frac{\sin \pi t/T}{\pi t/T} \times \frac{\cos \times \pi t/T}{1 - 4x^2(t/T)^2}$$

where the parameter x equals the ratio of the excess bandwidth of the channel to the Nyquist bandwidth $$\frac{1}{2T}.$$

For all values of x, the function is "one" at the sample instant t=0, and "zero" at the sample instant t=±nT. Thus with the raised cosine pulse, signalling can occur at a rate $$\frac{1}{2T}$$

with zero intersymbol interference.

Another characteristic of the raised cosine function of FIG. 3 is that the eye diagram cross-over jitter is also affected by the choice of x. At x=0, the filter reverts to the unrealizable ideal filter. At x=0.5, there is still no intersymbol interferences, but cross-over jitter is present. At x=1, the filter bandwidth has doubled from the ideal case, but the cross-over jitter and ISI are both zero.

Typically, in a ideal digital transmission system, with substantially low bit error rates, filtering is distributed evenly over both the transmit and receive terminals. It can be appreciated that the ideal modulator pulse shaping filter would have the response of a Nyquist filter modified by a raised cosine function and equalized and thereafter taken to the square root.

Figure 4:
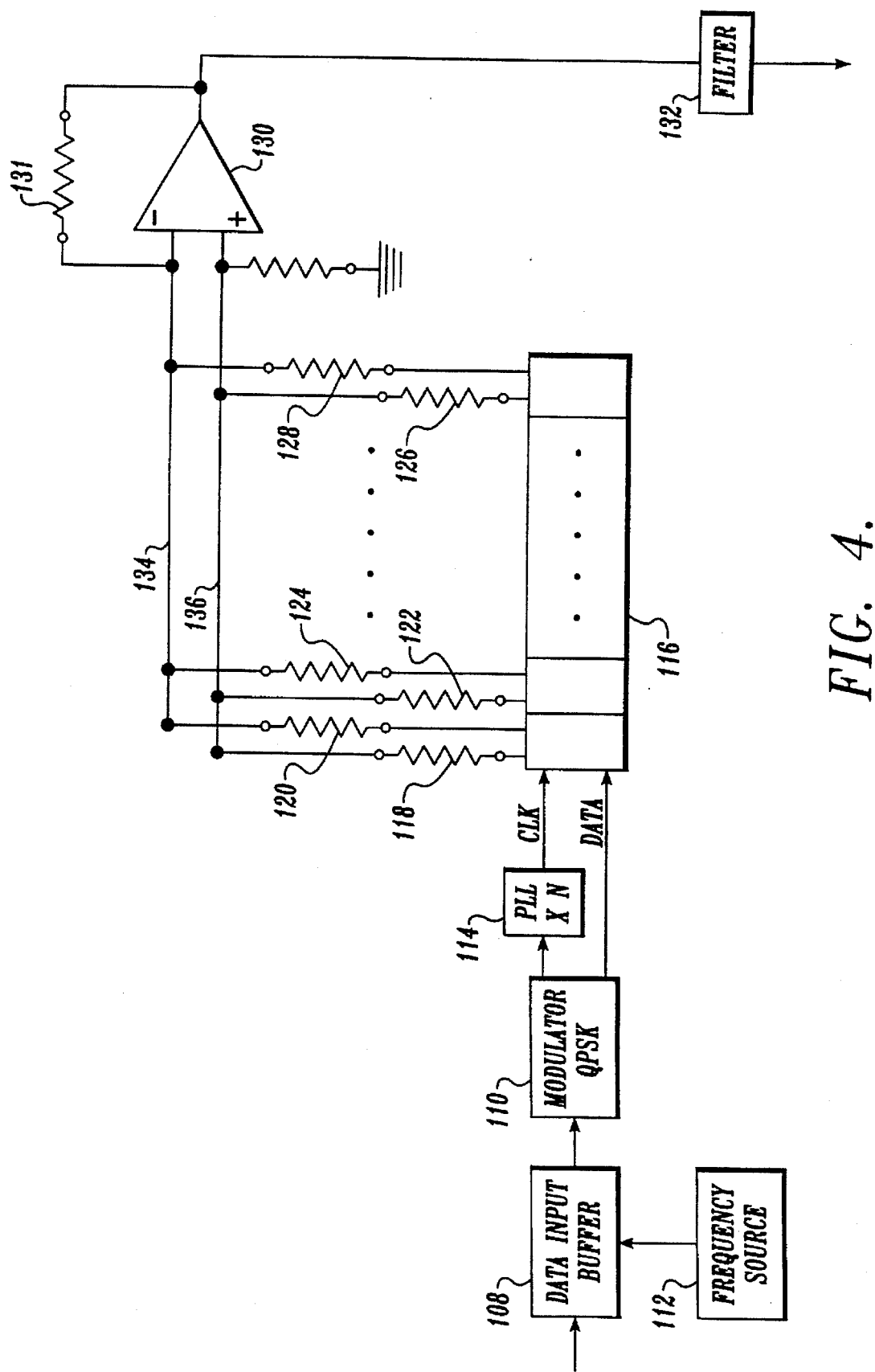
FIG. 4 illustrates a block diagram of the waveshaping filter according to the present invention.

FIG. 4, illustrates a digital transmission system employing a Nyquist pulse shaping filter according to the present invention. Accordingly, digital data corresponding to video or audio signal to be transmitted, is provided to a data input buffer 108. That output of the data input buffer is coupled to a modulator 110. Alternatively, the digital data corresponding to the video or audio signal to be transmitted may be provided directly to the modulator. A frequency source 112 is coupled to the modulator for providing a carrier frequency.

The output of the modulator is coupled to a phase locked loop (PLL) 114. The phase locked loop is adapted to provide an oversampling clock frequency to a shift register 116 at three times the data rate provided by the modulator. It can be appreciated that the oversampling ratio may be varied according to design considerations. The output of the phase locked loop (PLL) therefore, provides the clocking frequency to the clock input port of shift register 116 at a rate of three times the data rate.

A separate output of the modulator is also coupled to the data input port of shift register 116. The length of the shift register depends on the oversampling ratio provided by the phase locked loop. Therefore for higher oversampling ratios a longer length shift register must be utilized. For an oversampling ratio of three, a shift register having eleven registers may be used.

Each bit register of the shift register provides a high signal, i.e., a "one", or a low signal, i.e. a "zero", in parallel to a plurality of resistors.

As illustrated in FIG. 4, each bit of shift register 116, is coupled to two resistors. However, during the actual operation of the filter only one of the two resistors connects the register to either one of buses 134 or 136.

Bus 134 is connected to the inverting input of an operational amplifier 130. Similarly, bus 136 is connected to the non-inverting input of the operational amplifier. Resistor 131 couples the output of the operational amplifier to the inverting input. Resistor 138 couples the inverting input of the operational amplifier to ground.

Busses 134 and 136 permit bipolar connection to the shift register, and the operational amplifier operates as a summing device.

The output of the operational amplifier is coupled to a filter 132 which is adapted to operate as an anti-aliasing filter.

It can be appreciated as illustrated in FIG. 4, that phase-locked loop 114, shift register 116, resistors 118 through 128 and, summer 130 and filter 132 operate as a digital filter. As the output of the modulator is sampled due to the clocking provided by the phase-locked loop, and the sampled data is provided to the shift register each bit of the shift register provides a unit delay element, and each resistor provides a weighing coefficient by which the delayed signals are multiplied prior to the summation by the summer 131.

Thus, it can be appreciated that the output of the operational amplifier 130 can be seen to be the discrete convolution of the input signal with the impulse response of the filter.

Since the output of the modulator 110 of FIG. 4, consists of one's or zero's it can be assumed that each "one" bit is an impulse and therefore the output of operational amplifier 130 is the impulse response of the filter. Furthermore, the impulse response of the filter is defined by the value of the resistors coupled to bus 134 and 136.

Figure 5:
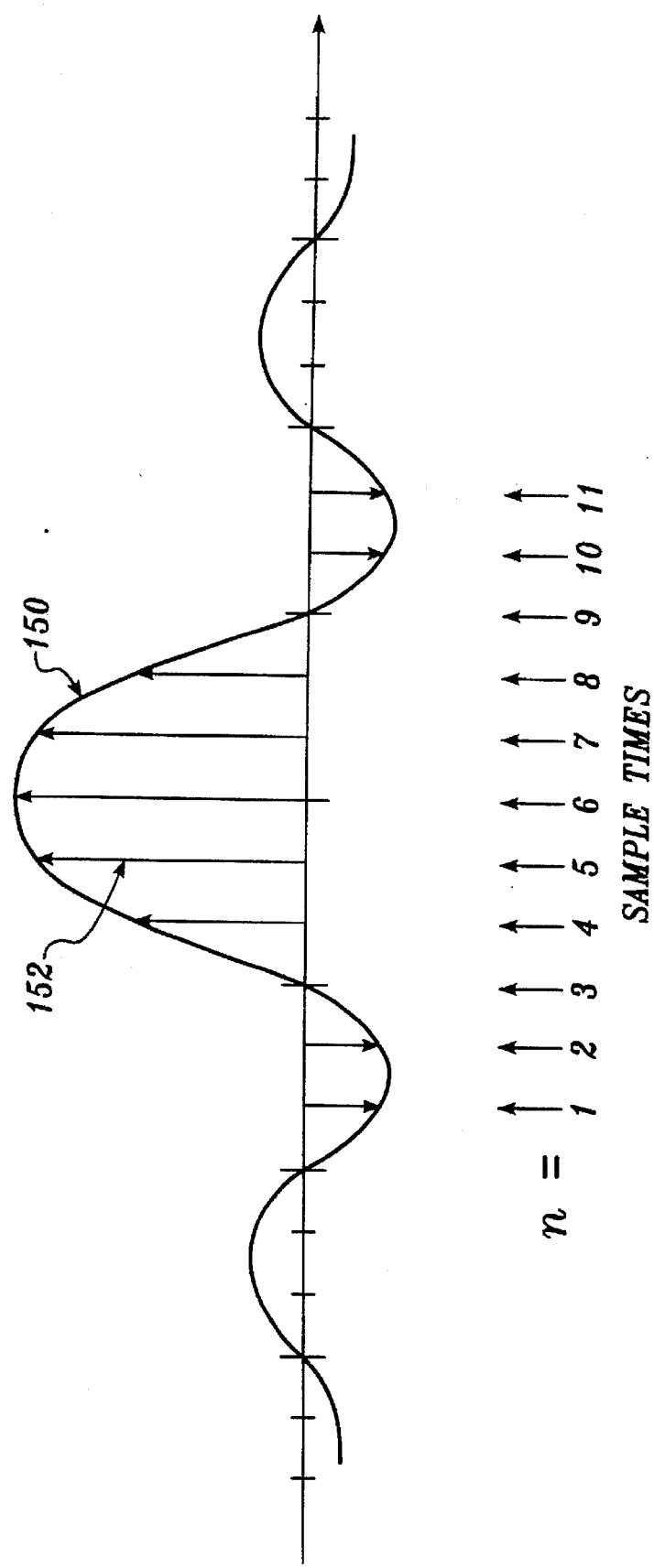
FIG. 5 illustrates an impulse response that can be generated according to the present invention.

As an example, a desired impulse response is illustrated in FIG. 5. It can be appreciated that when the output of the filter provides a signal 150 as illustrated in FIG. 5, the intersymbol interference will be eliminated. Therefore, for data samples equal to "one", signal 150 may be provided to accomplish Nyquist pulse shaping.

Signal 150, in FIG. 5, may be sampled to provide a plurality of samples values 152 of the impulse response defined as h(n). It can be appreciated that the number of samples values of impulse response is equal to the length of shift register 116 illustrated in FIG. 4. Each sampled impulse response h(n) may be digitally stored. The bit period of the impulse response 150 is equal to the inverse of data rate. Furthermore, the impulse response has zero value at three bit periods away from its maximum. This ensures that there will be substantially no intersymbol interference. It can also be appreciated that the sampling rate of the impulse response is equivalent to the clocking rate provided by the phased lock loop 114 of FIG. 4.

The resistors illustrated in FIG. 4, may be designed such that the sum of the products as the impulse is shifted through, is equal to the sampled impulse response. Given no oversampling, the impulse is a single binary one shifted through shift register 116 of FIG. 4, resulting in a set of tap weight whose values are exactly equal to the impulse response series of FIG. 5. When oversampling is used, the impulse is effectively stretched out into a length equal to the oversampling ratio. Thus, once the impulse is shifted through, it will overlay several taps or resistors at once, and the sum of those weights must be substantially equal to the impulse response.

Figure 6:
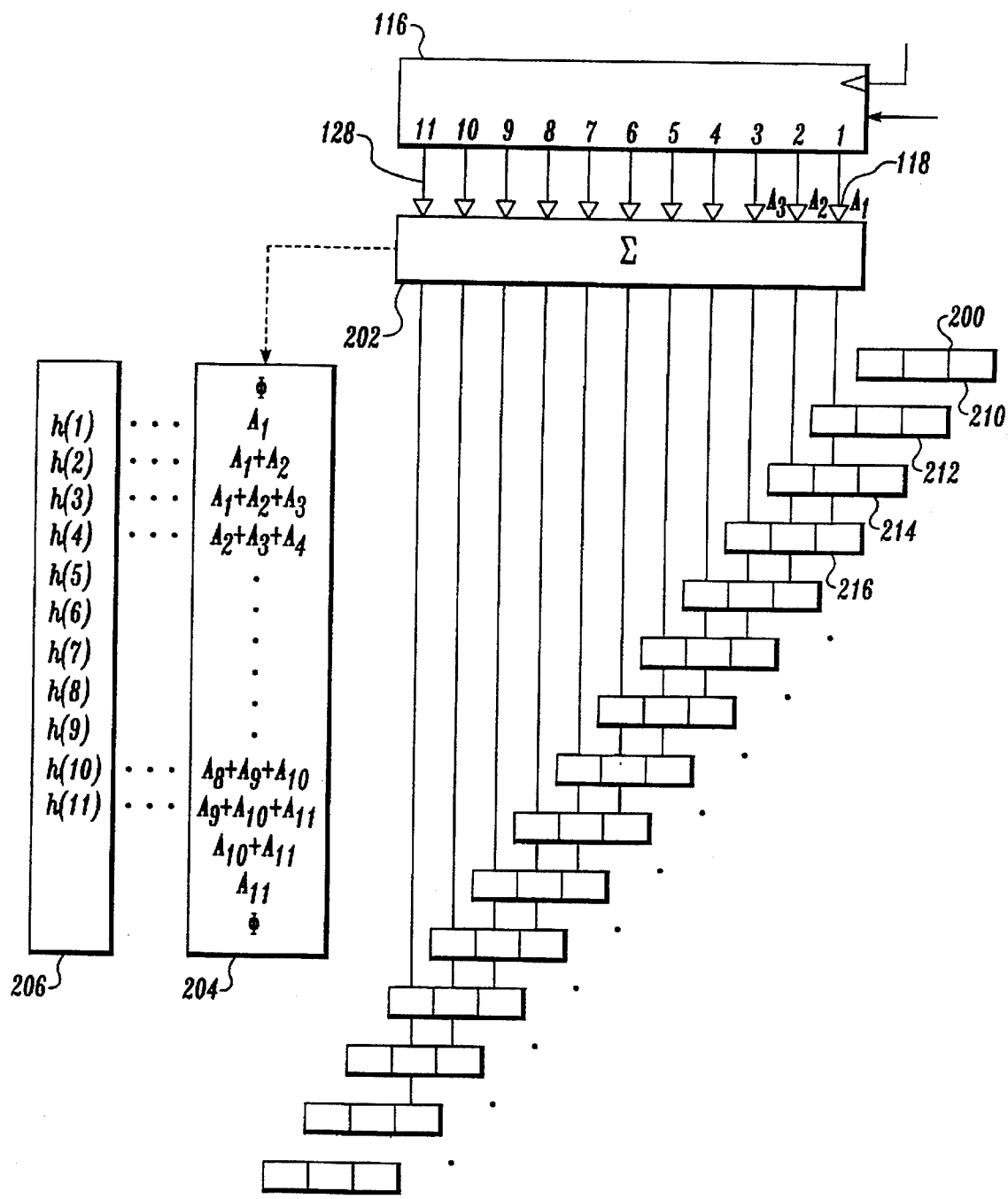
FIG. 6 is a timing diagram of the filter illustrated in FIG. 4.

The value of the resistor when oversampling is utilized may be predetermined. Therefore, as mentioned above, according to one embodiment of the invention, the oversampling ratio may be three and the shift register length be eleven as illustrated in FIGS. 4 through 6. As indicated above the phase-lock loop 114 of FIG. 4 provides a clocking frequency at three times the data rate, and therefore an impulse will last for three shift register clock cycles.

FIG. 6 illustrates the time diagram of the filter illustrated in FIG. 4. As shown in FIG. 6 a pulse 200 may be provided for Nyquist wave shaping. The pulse is thereafter provided to the data input part of shift register 116. The clocking input part of the shift register receives clocking frequency from phase-lock loop 114 of FIG. 4.

The resistors coupled to shift register as illustrated in FIG. 4, are shown as tap weights A in FIG. 6. Therefore, each bit of shift register 116 is coupled to a tap weight A which corresponds to a resistor in FIG. 4.

The tap weights are coupled to a summer 202. Block 204 represents the data provided at the output of the summer as impulse 200 is clocked throughout shift register 116.

It can be appreciated that the output of the summer 202 when an impulse is shifted through the shift register, is the impulse response of the filter. Therefore block 206 may represent desired impulse response as the impulse 200 is shifted in shift register 116. In one embodiment of the invention block 206 may be a memory representing the desired sample values of impulse response of FIG. 5.

As mentioned before the shift register is clocked at three times the data rate. Therefore, impulse signal 200 appears as a "one" for three cycles of the shift register. Step 210 in FIG. 6 illustrates signal 200 being stretched into three "one's" due to the clocking frequency.

At step 212 the impulse 200 is shifted into register 1 of the shift register. The output of summer 208 is therefore equal to the weight of the first tap $A_1$ as illustrated by block 204. By comparing blocks 204 and 206 it can be appreciated that the value of the first resistor is substantially equal to the first time sample h(1) of the impulse response.

At step 214, the impulse 200 is shifted into registers 1 and 2 of shift register 116. The output of the summer becomes equal to the sum of the first and second tap weights or resistors, as illustrated by block 204. As the first resister value is already determined, the second tap weight or resister may be derived by comparing the sum with the second time sample h(2) of the impulse response. Therefore, the second tap weight must be substantially equal to the second sample value of the impulse response h(2), minus the first tap weight previously delivered.

At step 216, the impulse 200 shifts into registers 1, 2 and 3 of shift register 116. The output of the summer becomes equal to the sum of the first, second and third tap weights or resistors as illustrated by block 207. Since the first two tap weights or resistor value is already known, the first tap weight or resister may be derived by referring to the third sample value h(3) of the impulse response.

As the process goes on, there will always be one weight which is not defined and two others which have already been determined. By setting the sum of corresponding weights equal to the impulse response sample value, the undetermined weight can be determined.

At the end of the sequence, as the stretched impulse passes out of the shift register, all of the tap weights have been defined. However, there will still be two cycles remaining before the impulse is fully shifted out. Those two steps are predetermined, and cannot be compensated for, but as the "tail" of the response will last for less than a data bit period inter symbol interference will not be substantially affected.

It can be appreciated that the value of resistors connected to the shift register in FIG. 4 can be determined prior to implementation of the filter based on above-described timing diagram analysis. A variety of wave forms may thus be provided by considering a desired impulse response and deriving the appropriate value for the resistors.

Furthermore, since the impulse response is symmetric about the center of the filter, the resulting frequency domain response of the filter will have a linear phase response which is a highly desirable characteristic in digital transmission. Hence, the impulse response reaches it's maximum value as the impulse is shifted into the center of the filter, and has a symmetrically tapered response away from the center.

Since the impulse response of a low pass filter is symmetric about it's maximum, the resistors for tap weights will be symmetric as well. The average delay through the filter is equal to one half of the shift register length times the sampling period.

It can be appreciated that with longer shift register lengths, the impulse response can be controlled for a longer time, and with a higher oversampling ratio, the response more clearly realizes the desired continuous impulse response, and will require less smoothing. In one embodiment of the present invention, a register length of 24 bits and an oversampling ratio of four may provide desirable results for digital video transmissions with data rates up to 3.6M bits/second.

The invention in its broader aspects therefore is not limited to the specific embodiment shown herein. Departures may be made therefrom within the scope of the accompanying claims without departing from the principles of the invention and without sacrificing its chief advantages.

What is claimed is:

1. A pulse shaping filter for shaping pulses received at a specified data rate, said filter having a desired impulse response associated with a plurality of sampled values, said filter comprising:

a sampling circuit responsive to said pulses, wherein said sampling circuit is a phase locked loop which provides an adaptive clocking signal to a shift register with a plurality of parallel bit registers, adapted to sample each pulse at a desired sampling rate;

a delay circuit providing a plurality of delayed versions of said sampled pulse, said delay circuit comprising said shift register, wherein said sampled pulse propagates through said delay circuit at a unit delay time substantially equal to the period of said desired sampling rate;

a plurality of resistors coupled to each bit register of said shift register, each resistor providing a weighing coefficient by which the delayed versions of said sampled pulses are multiplied to provide a plurality of weighed delayed pulses;

a summing circuit adapted to add all said weighed delayed pulses to provide shaped pulses; and said resistors selected such that each sum of said weighed delayed pulses as the pulses are propagated through the delay circuit is substantially equal to a corresponding sampled value of said impulse response.

2. The invention as claimed in claim 1, wherein said desired sampling rate is substantially equal to the data rate.

3. The invention as claimed in claim 1, wherein said desired sampling rate is equal to said data rate times a sampling ratio.

4. A pulse shaping filter for shaping pulses received at a specified data rate, said filter having a desired impulse response associated with a plurality of sampled values, said filter comprising:

a phase-locked loop responsive to said pulses, said phase-locked loop adapted to provide a clock signal at a desired clocking rate;

a shift register having a data input port for receiving said pulses and a clock input port for receiving said clock signal, such that said pulses are each sampled at a rate substantially equal to said clocking rate, said shift register providing a plurality of delayed versions of said sampled pulse, wherein said sampled pulse propagates through said shift register at a unit delay time substantially equal to the period of said desired clocking rate;

a plurality of resistors coupled to each bit register of said shift register, each resistor providing a weighing coefficient by which the delayed versions of said sampled pulses are multiplied to provide a plurality of weighed delayed pulses;

an operational amplifier having an inverting and a non-inverting input adapted to add all said weighed delayed pulses to provide shaped pulses; and said resistors selected such that each sum of said weighed delayed pulses as the pulses are propagated through the shift register is substantially equal to a corresponding sampled value of said impulse response.

5. The invention as claimed in claim 4, further comprising a first and second connecting bus, wherein said first bus is coupled to the inverting input of the operational amplifier, and said second bus is coupled to the non-inverting input of the operational amplifier, wherein each bit of said shift register is coupled to either of said first or second busses via a first or a second resistor, said bus configuration permitting a bipolar connection to the shift register.

6. A method for shaping pulses received by a filter at a specified data rate, said filter having a desired impulse response associated with a plurality of sampled values, said method comprising the steps of:

sampling said pulses at a desired sampling rate, wherein said step of sampling comprises the step of providing by a phase-locked loop, a clocking signal to said clock input port of said shift register at a rate substantially equal to said desired sampling rate;

providing a plurality of delayed versions of said sampled pulses, by shifting said sampled pulses through a shift register with a plurality of bit registers, wherein said sampled pulses propagate through said shift register at a unit delay time substantially equal to the period of said desired sampling rate;

providing weighing coefficients by which the delayed versions of said sampled pulses are multiplied to provide a plurality of weighed delayed pulses, said weighing coefficients provided by resistors connected to each bit register of said shift register, said resistors selected such that each sum of said weighed delayed pulses as the pulses are propagated through the shift register is substantially equal to a corresponding sampled value of said impulse response; and adding all said weighed delayed pulses to provide shaped pulses.

7. The method as claimed in claim 6, wherein said step of sampling includes the step of providing a sampling rate that is substantially equal to the data rate.

8. The method as claimed in claim 6, wherein said step of sampling includes the step of providing a sampling rate that is equal to said data rate times a sampling ratio.

* * * * *